United States Patent
Menard et al.

(10) Patent No.: US 7,065,566 B2
(45) Date of Patent: Jun. 20, 2006

(54) SYSTEM AND METHOD FOR BUSINESS SYSTEMS TRANSACTIONS AND INFRASTRUCTURE MANAGEMENT

(75) Inventors: Cody Menard, Houston, TX (US); Raghavendra K. Murthy, Houston, TX (US); Brian Wolfe, Austin, TX (US)

(73) Assignee: Tonic Software, Inc., Austin, TX (US)

( * ) Notice: Subject to any disclaimer, the term of this patent is extended or adjusted under 35 U.S.C. 154(b) by 778 days.

(21) Appl. No.: 09/681,419

(22) Filed: Mar. 30, 2001

(65) Prior Publication Data

US 2002/0173997 A1 Nov. 21, 2002

(51) Int. Cl.
*G06F 17/60* (2006.01)

(52) U.S. Cl. .......................... 709/223; 709/224; 705/1

(58) Field of Classification Search ................ 709/223, 709/224, 203; 714/47; 705/1
See application file for complete search history.

(56) References Cited

U.S. PATENT DOCUMENTS

| | | | |
|---|---|---|---|
| 5,764,897 A | 6/1998 | Khalidi | |
| 5,958,010 A | 9/1999 | Agarwal et al. | |
| 6,115,693 A | 9/2000 | McDonough et al. | |
| 6,138,157 A | 10/2000 | Welter et al. | |
| 6,144,961 A | 11/2000 | de la Salle | |
| 6,148,335 A * | 11/2000 | Haggard et al. | 709/224 |
| 6,195,697 B1 | 2/2001 | Bowman-Amuah | 709/224 |
| 6,230,199 B1 * | 5/2001 | Revashetti et al. | 709/224 |
| 6,345,239 B1 | 2/2002 | Bowman-Amuah | 703/6 |
| 6,397,359 B1 * | 5/2002 | Chandra et al. | 714/712 |
| 6,427,132 B1 * | 7/2002 | Bowman-Amuah | 703/22 |
| 6,502,131 B1 * | 12/2002 | Vaid et al. | 709/224 |
| 6,505,244 B1 * | 1/2003 | Natarajan et al. | 709/223 |
| 6,539,427 B1 * | 3/2003 | Natarajan et al. | 709/224 |
| 6,584,502 B1 * | 6/2003 | Natarajan et al. | 709/224 |
| 6,611,867 B1 * | 8/2003 | Bowman-Amuah | 709/224 |
| 6,675,128 B1 * | 1/2004 | Hellerstein | 702/182 |
| 2002/0046363 A1 * | 4/2002 | Nelson et al. | 714/31 |
| 2002/0099578 A1 * | 7/2002 | Eicher et al. | 705/7 |

(Continued)

FOREIGN PATENT DOCUMENTS

WO WO 2079928 A2 * 10/2002

OTHER PUBLICATIONS

Lawerence Ho et al.; Network and Service Anomaly Detection in Multi-Service Transaction-Based Electronic Commerce Wide Area Networks; Fifth IEEE Symposium on Computers and Communications, 2000; pp. 291-296; Jul. 2000.*

(Continued)

*Primary Examiner*—Kenneth R. Coulter
(74) *Attorney, Agent, or Firm*—Wilson Sonsini Goodrich & Rosati

(57) ABSTRACT

The system and method for business systems transactions and infrastructure management includes a client side collection system and a server side system having the capability to communicate with the other over a secure communication path. The collection system extracts transaction and infrastructure data from a business system and transmits the extracted data to the management server over a secure communication path. The management server receives the extracted data over the secure communication path, compares it to threshold analyzes the data that exceed threshold values, and notifies a user of the results of the analysis. The management server also has the capability to activate corrective scripts in the client business system and to reconfigure the client business system.

27 Claims, 7 Drawing Sheets

U.S. PATENT DOCUMENTS

| | | | |
|---|---|---|---|
| 2002/0099579 A1* | 7/2002 | Stowell et al. | 705/7 |
| 2002/0099580 A1* | 7/2002 | Eicher et al. | 705/7 |
| 2002/0099598 A1* | 7/2002 | Eicher et al. | 705/11 |
| 2002/0143931 A1* | 10/2002 | Smith et al. | 709/224 |
| 2002/0161611 A1* | 10/2002 | Price et al. | 705/7 |
| 2003/0004742 A1* | 1/2003 | Palmer et al. | 705/1 |
| 2004/0054717 A1* | 3/2004 | Aubry et al. | 709/203 |
| 2004/0059789 A1* | 3/2004 | Shum | 709/206 |
| 2004/0064546 A1* | 4/2004 | Olsson et al. | 709/224 |
| 2005/0125768 A1* | 6/2005 | Wong et al. | 717/100 |

OTHER PUBLICATIONS

Joseph L. Hellerstein et al.; An Approach to Preditive Detection for Service Management; Proceedings of the Sixth IFIP/IEEE International Symposium on Integrated Network Management, 1999; pp. 309-322; May 1999.*

* cited by examiner

SYSTEM AND METHOD FOR BUSINESS SYSTEMS TRANSACTIONS AND INFRASTRUCTURE MANAGEMENT

BACKGROUND OF INVENTION

This invention relates generally to ensuring business system performance, and more particularly, to monitoring, analyzing, and optimizing systems performance achieve information technology goals and business objectives.

In the developing years of business use of electronic systems, business were used primarily for accounting and records keeping functions. As these grew in capability and features, business managers began to make use of these capabilities and features in new ways to improve business performance. With the widespread acceptance and use of the Internet for conducting on-line commercial and consumer transactions, these business systems have become increasingly complex and geographically distributed. At the same time, there developed increasing demand for higher performance and increased reliability or "uptime" to satisfy these business needs. This has put greater emphasis and visibility on the of the information technology (IT) infrastructure of e-commerce businesses, and people that support these systems. Concurrently, there has developed a trend whereby business managers have a need to play a more active role in IT infrastructure decision-making.

Conducting business over the Internet has created many new challenges that difficult to manage using conventional approaches. Companies with activities that rely on e-commerce struggle to find solutions that will assist with managing increasingly complex infrastructure while satisfying a more demanding customer base. In particular, downtime costs can have a substantial impact on the gross revenues of an e-commerce organization, as well as losses due to brand erosion customer dissatisfaction. As these companies become increasingly dependent e-Business as a significant source of revenue, the success of the overall business is inextricably linked to the health of the IT infrastructure. The lack of tools to communicate critical information concerning the condition of the IT infrastructure business managers further complicates this picture. A further complexity is that many e-commerce systems are widely distributed over a large geographic area, where a principle means of communications between parts of the system is via-the Internet.

Businesses are further faced with the problem of translating IT organization performance goals into objectives that satisfy the needs of the business. While is a need for a reliable, high performance infrastructure for executing business processes, there is often a lack of understanding of the impact that systems, applications, and process execution breakdowns have on business objectives, because of the inability to measure IT performance against business objectives. Regarding reliability and performance, existing management tools for heterogeneous and complex business processes offer incomplete and inadequate coverage of individual infrastructure elements. There is a lack of a systems management solution that encompasses the entire execution infrastructure as a single entity, capturing the interrelations between systems, applications, and business processes. A solution must be capable of automatically adapting to constant changes in this execution environment.

It is often difficult for IT organizations to relate the impact of process breakdowns to business objectives. Since infrastructure failures are viewed as isolated IT events, the impact on the business is noticed only when a product line manager or analyst sees a change in business performance. A solution is needed that will capture the business process workflows and relate potential and actual infrastructure breakdowns to business process execution, enabling IT and business managers to find a collaborative solution. It is desirable to have a solution that is capable of expediting and automating the remediation process.

IT contributions to the core business are often measured using IT-oriented metrics, rather than metrics that support IT contributions to business goals or corporate strategy. A solution is needed that reports IT performance in terms of business metrics rather than infrastructure performance. By combining business IT metrics, information may be generated that will enable business decisions to be made based on a correlation of IT performance and business goals.

This environment has created a need for a unified solution for monitoring the health of real-time e-business infrastructures to improve the quality, reliability and total cost of ownership of e-business sites. This translates to the bottom line as greater customer satisfaction, a loyal customer base, and increased revenues. It is therefore an object of the present invention to provide a comprehensive solution managing complex e-business infrastructures.

Another object of the present invention is to enable improved performance of commerce systems by monitoring e-business transaction integrity, transaction performance, and infrastructure reliability, with a focus on problem identification, diagnosis and analysis.

Yet another object of the present invention is to collect data from e-commerce systems and transmit this collected information to a business systems transaction and infrastructure management system for evaluating, reporting, and managing e-commerce system configuration, providing real-time diagnostics, predictive and impact analysis, and by reducing downtime and detecting incipient failures before there is a significant impact of business performance.

SUMMARY OF INVENTION

The present invention satisfies the needs for transaction monitoring and infrastructure management of modern business systems by providing core technology for management of applications, databases, web servers, and operating systems. It also has the capability to manage the dynamic relationships between each of the major components of business systems by making use of a knowledge base and collected data to diagnose, analyze, and resolve problems in real time. present invention provides predictability by ensuring reliability, repeatability, and optimal performance. It improves the total cost of ownership by reducing support costs, reducing time for problem resolution, and predicting and preventing problems. The business systems transaction and infrastructure management makes use of light-weight data collectors embedded in a client system to extract depth information about e-business applications, web servers, databases, systems and hardware platforms in a transaction execution environment. This collected data is delivered to a management system server where it is recorded and analyzed. If a problem is identified, the relevant condition is diagnosed and corrective action is either recommended or automatically implemented.

The management server contains powerful analysis engines that allow the software to quickly diagnose complex, cross-domain problems, analyze system performance, forecast potential failures, and recommend or automate corrective actions. The management system can also automatically reconfigure the client system to adapt to environment changes and provide remote notification for problems requiring immediate attention. Key capabilities include real-time of cross-domain problems, performance analysis, predictive analysis, automated problem solving, remote notification, and automatic configuration capability.

The business systems transaction and infrastructure management system improves the reliability, repeatability, and total cost of ownership of complex business environments. Use of this system results in optimized performance, increased reliability, and enhanced availability to increase customer satisfaction retention. The management system minimizes or eliminates transaction failures, thereby reducing lost revenue, protecting brand image, and safeguarding Visibility is provided into all aspects of the business system environment, enabling optimal configuration control and facilitating troubleshooting. Root-cause analysis of cross-domain problems and automated/recommended corrective actions reduce support costs and enable proactive improvements to the transaction execution environment. Impact analysis improves resource prioritization and facilitates proactive response to problems affecting overall business.

One embodiment of the present invention is a system for managing business systems transactions and infrastructure that comprises a collection system embedded in a client system, which includes one or more data collectors having at least one plug-in for extracting data from client system components, and a secure client connection to a communication network for transmitting the extracted data from the client aggregator and communicating over the network, and a server, which includes a system manager for controlling the management server, a secure server connection to the communication network for communicating over network and receiving the extracted data from the client collection system, the system manager for comparing the received extracted data with threshold values, a repository for storing a knowledge base and the extracted data, a reasoning for performing data analysis on the extracted data that exceed threshold values, a notifications manager for notifying users of abnormal conditions based on the analysis. The system may further comprise a client aggregator for receiving the extracted data from the data collectors and a server aggregator for receiving the extracted data from the secure connection. The system may further comprise a corrective actions manager for activating corrective action scripts in client systems over the communication network. The system may further comprise a graphical interface server connected to the secure server connection to the communication network and a web browser graphical user interface connected to the secure client connection to the communication network for communication with the graphical user interface server. The collection system may further comprise one or more configuration clients for receiving configuration commands for configuring the system, and the management server may further comprise a configuration for sending configuration commands to the collection system. The data collector plug-in may be selected from the group consisting of operating system plug-in, database plug-in, business process plug-in, web server plug-in, and application plug-in. The secure server connection and the secure client connection to the communication network may be firewalls. The management server may further comprise a business process manager for analyzing and tracking client business system processes based on the extracted data. The management server may comprise a data processor for performing complex calculations. The management server reasoning system may comprise a diagnostic engine and a predictive engine for analyzing the extracted data datasets and activating the notifications manager. The management server reasoning system may comprise a diagnostic engine and a predictive analysis engine for analyzing the extracted data datasets and activating the corrective actions manager. The repository may be an object oriented database management system. The repository may be a relational management system. The system components from which data are extracted may selected from the group consisting of a database host operating system, a host database management system, a database host business process, a database host hardware components, a web host operating system, a web host web server, a web host business process, a web host hardware components, an application host operating system, an application host application programs, an application host business process, and an application host hardware components. The embedded collection system may further include corrective scripts associated with the data collectors that are activated by a server command from the corrective actions manager. The communication network may be the Internet.

Another embodiment of the present invention is a method for managing business systems transactions and infrastructure, which comprises the steps of extracting data from client system components by a data collector and data plug-ins, transmitting the extracted data through a secure client connection to a communication network, receiving the extracted data through a secure server connection to the communication network, comparing the extracted data by a system manager with threshold values stored in a repository, submitting the extracted data to a reasoning system if the extracted data exceeds a threshold value, analyzing the extracted data submitted to the reasoning system, and a user affected by the results of the reasoning system analysis by a notification manager. The method may further comprise aggregating the extracted data by a client aggregator, transmitting the extracted data by the client aggregator, and receiving the extracted data by a server aggregator. The method may further comprise storing the received extracted data in the repository. The method may further comprise automatically activating a corrective script in the client system by corrective actions manager to correct a problem found by analyzing the extracted data. The method may further comprise manually activating a corrective script in client system by a corrective actions manager to correct a problem found by analyzing the extracted data. The analyzing step may comprise detecting a from the extracted data by a diagnostic analysis engine and associating the problem with a recommended solution found in a knowledge base stored in the repository. The analyzing step may comprise collecting the extracted data over detecting a trend in the collected extracted data by a predictive analysis engine, estimating a time duration for a failure condition to occur. The notifying step may comprise accessing a knowledge base in the repository to determine a user by the results of the reasoning system analysis, sending the results of the system analysis to a graphical user interface server, and transmitting the analysis results over the communication network to a client web browser graphical user interface for presentation to the affected user. The notifying step may be selected from the group consisting of transmitting an email message, sending a numeric page, and transmitting a text page. The method may further comprising a client system configuration change request from a client web browser graphical user interface through the secure client connection to the communication network, receiving the configuration change request by a configuration server through the secure server connection to the communication network, communicating the configuration change request to a configuration manager from the graphical user interface server, validating the configuration change request and communicating a configuration change order to the graphical user interface server by the configuration manager, transmitting the configuration change order from the graphical user interface server through the secure server connection to the communication network, and receiving the configuration change order by a configuration client through the secure client connection to the communication network. A computer-readable medium may contain instructions for controlling a computer system to carry out the steps of this embodiment of the invention.

Yet another embodiment of the present invention is a method for managing business systems transactions and infrastructure, which comprises the steps of receiving extracted transactions and infrastructure data from a business system, comparing the extracted data with threshold values stored in memory, analyzing extracted data that exceeds threshold values, and notifying a user of a result of the analyzing step. The method may further comprise activating a corrective script based on a result of the analyzing step. The method of may further comprise sending configuration commands to the business system. The method may further comprise sending notifying information to a graphical user interface. A computer-readable medium may contain instructions for controlling a computer system to carry out the steps of this embodiment.

Yet another embodiment of the present invention is a method for managing business systems transactions and infrastructure, which comprises the steps of extracting transactions and infrastructure data from a business system and the extracted data to a system for comparing with thresholds, analyzing extracted data that exceeds thresholds, and notifying a user of a result of the analyzing step.

The method may further comprise activating corrective scripts in the business system. The method may further comprise reconfiguring the business system upon receipt of a reconfiguration command. The method may further comprise receiving notification information and presenting the information on a graphical user interface. A computer-readable medium may contain instructions for controlling a computer system to carry out the steps of this method.

BRIEF DESCRIPTION OF DRAWINGS

These and other features, aspects, and advantages of the present invention will become understood with regard to the following description, appended claims, and accompanying drawings where:

DETAILED DESCRIPTION

Figure 1:
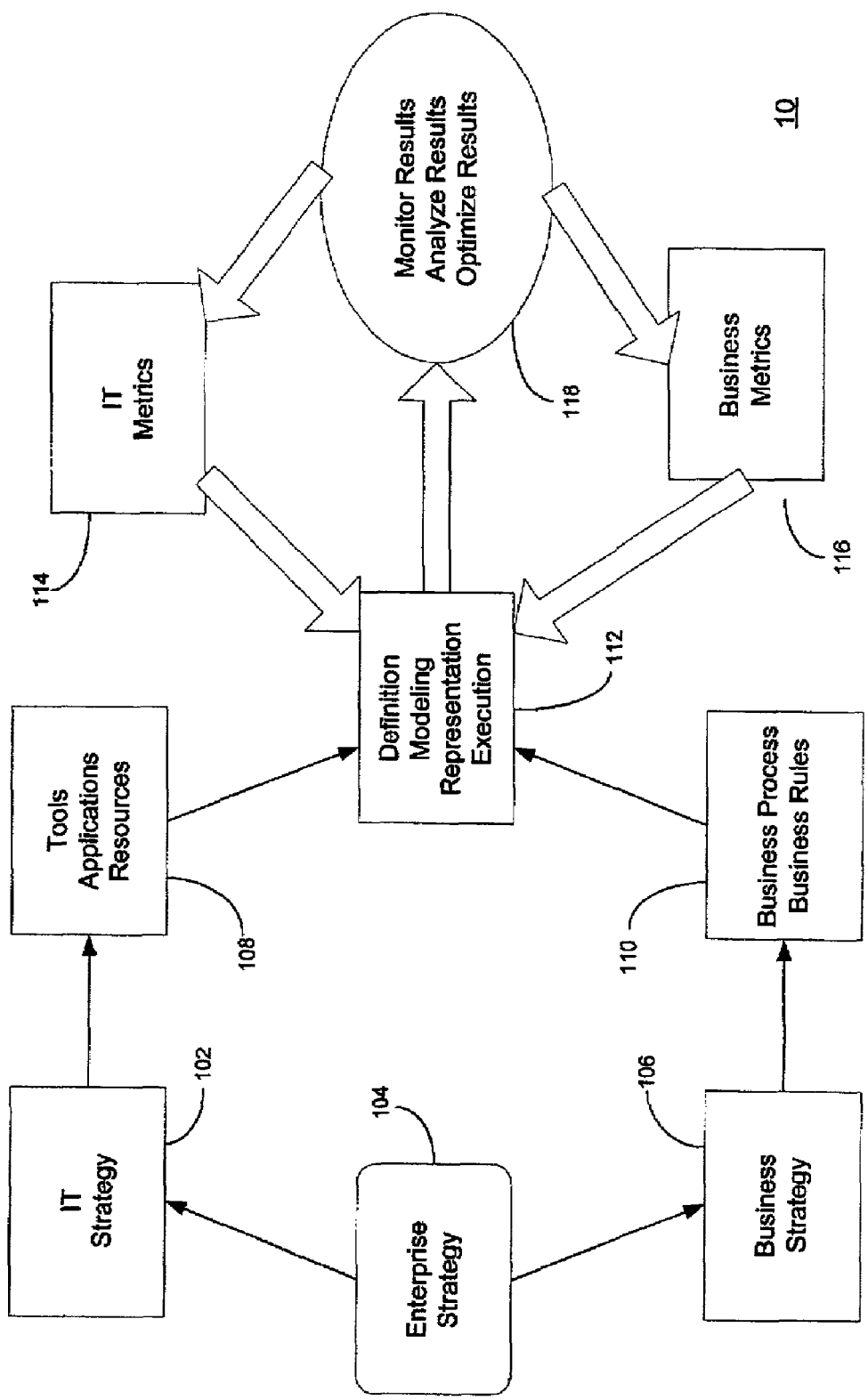
FIG. 1 shows a representation of a business process execution environment.

Turning now to FIG. 1, FIG. 1 shows a representation 10 of a business process execution environment of the present invention. This is the environment in which a business management system must function. An IT strategy 102 and a business strategy 106 are derived from an enterprise strategy 104. From the IT strategy tools, applications, and resources 108 are determined that are necessary to implement the IT strategy 102. Similarly, business process and business rules 110 are formulated to meet the business strategy 106. A management system is then defined, modeled, and executed to meet the IT strategy 102 and the business strategy 106. The IT organization must then monitor, analyze and optimize the results 118 by determining IT metrics 114 and business metrics 116. These 114, 118 are then fed back to the definition and execution 112 of the management system to further improve performance. To determine whether business unit objectives are being met, IT organizations must understand the impact of systems, applications, and process failures on the business objectives. The present management system models and monitors an organization's business processes infrastructure components to capture business process execution 112. Monitoring, analyzing and optimizing the execution of the business process ensure that IT achievements meet business unit objectives. Knowledge of the relationship business processes and infrastructure components helps to identify compromised business objectives. By determining the dynamic path of execution for business processes, organizations can ensure an optimized workflow and healthy execution environment. The system monitors the business process transactions and the behavior of the infrastructure components for detecting execution failures and diagnosing the cause of such failures.

To monitor the execution of a business process, the system must provide into the health of the system from the perspective of the business process. The system must analyze factors such as the number of executions, the length of executions, the presence of failed executions and their causes, and the consequences of the system failure on the business process. Process monitoring involves tracking the execution of business processes across applications and IT components, and collecting status information at each execution step, such as current order state, database data volume, total number of orders processed, and number of orders fulfilled and orders not fulfilled. Monitoring a business process involves tracking various business processes such as web page generation, online purchasing, order notification, and order management; using predefined workflow models that encapsulate the business process hierarchy and its relationship with application and infrastructure components that comprise the process execution environment; tracking the execution of business processes using metrics from collectors; gathering, correlating, calculating, and aggregating execution data into workload data that is analyzed to determine the state of the execution process; detecting process execution failures and process execution bottlenecks; and aggregating various business-oriented metrics such as the number of business transactions executed over time, data volume by transaction type, number of process requests, etc. In addition, to monitor the execution of a business process, system first models the target business process and breaks it into a sequence of tasks. It then identifies the set of application or infrastructure components on the task relies in order to properly execute. These components identify the key performance indicators that are used to track and analyze the execution environment. Monitoring and diagnosis is facilitated in this low level data, resulting in three levels of information: a system-wide view of the business workload and infrastructure resource consumption; detailed view of failed executions of business processes; and historic view of the past business workload and system behavior.

Figure 2:
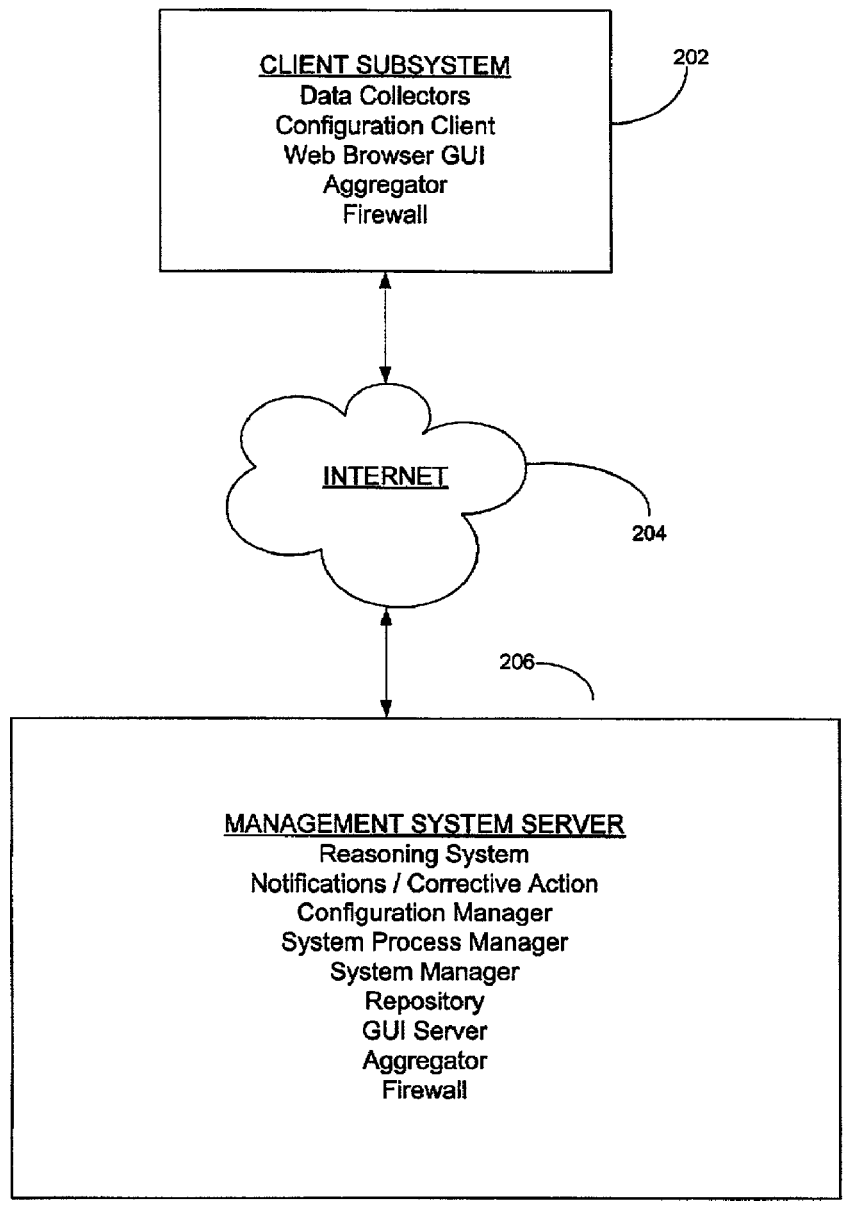
FIG. 2 shows the relationship between a client subsystem and a management system server.

Turning now to FIG. 2, FIG. 2 shows the relationship 20 between a client subsystem 202 and a management system server 206 connected via the Internet 204. The client subsystem 202 and the management system server 206 comprise elements of the present invention, a system for business systems transactions and infrastructure management. The client subsystem 202 includes data collectors for collecting data from a client's business system components, a configuration client for initiating and altering a configuration of the client's business system components, a web browser Graphical User Interface (GUI) for controlling the configuration client, an client side aggregator for collecting and routing data, enabling the data to pass through firewalls, and a client side firewall that connects to the Internet 204 for communicating with the management system server 206. data collectors extract data from every application, server, and database at every step of the execution process, which is analyzed and correlated by the system server 206 to detect execution failures. The management system server also connects to the Internet 204 by way of a server side firewall and a server side aggregator, for communicating with the client subsystem 202. The management system server 206 includes a reasoning system for diagnosing and predicting failures, means for notifying of a fault and for taking corrective action, a configuration manager for maintaining the configuration of the client's business system, a business process manager and a system manager, a data repository, and GUI server to handle the client subsystem configuration client. The management server 206 captures and represents expert knowledge about the system processes and infrastructure components. Through monitoring and analysis, the management system server 206 is able to detect and predict problems with performance and resource availability. Using an expert knowledge base, the system may recommend recovery actions for both immediate resolution and long-term problem prevention. It provides dynamic system analysis and diagnosis for identifying complex system problems involving multiple faults and symptoms across multiple enterprise components.

Taken together, the client subsystem 202 and the management system server 206 combine infrastructure management with business process visibility to the business transaction environment as a single entity. The management system assesses the state of the business and determines what conditions are affecting it based on collected data such as transaction execution information, including but limited to user navigation on the site, transactions being executed, transactions resulting in sales, etc. The system allows IT organizations to evaluate information against the business process to fully understand the business impact of IT events.

Figure 3:
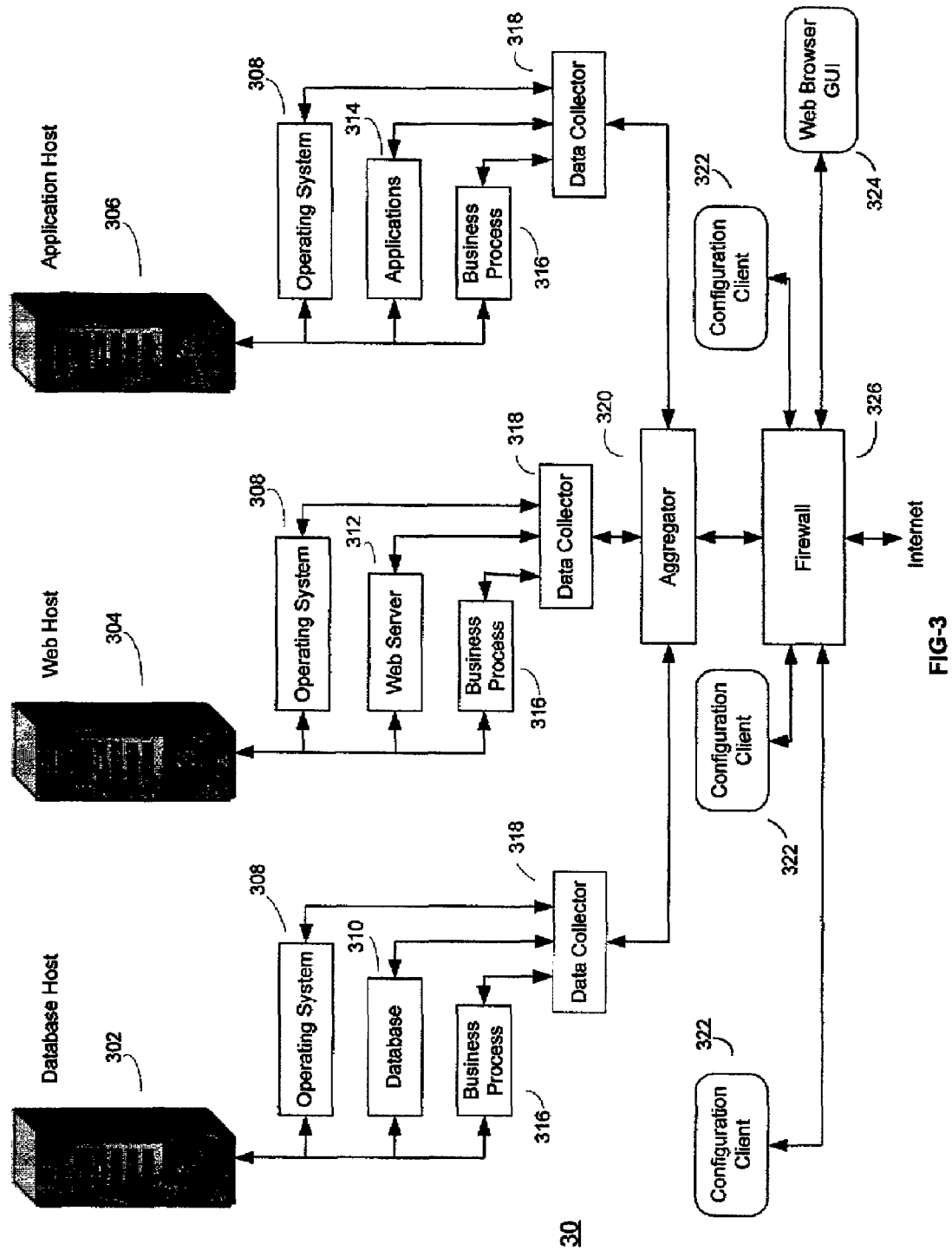
FIG. 3 shows an architecture of a collecting system that resides in one or more client host business systems.

Turning now to FIG. 3, FIG. 3 shows an architecture of a system client 30 that resides in one or more client host business systems. The system client comprises a collection system, a web browser based graphical user interface, and configuration clients. It works as an integral part of a business systems transactions and infrastructure management system that includes a management server. An embodiment of a management server for use with a collection system is described subsequently and shown in FIG. 4. The collection system uses lightweight data collectors 318 to retrieve information from business application hosts 306, server hosts 304, database hosts 302 and other components of a business system. All collected data is sent to a transactions and infrastructure management server, such as the embodiment shown in FIG. 4, where it is stored in a repository. The stored data is used to track client business systems processes, monitor performance, and predict and diagnose problems. The data extractors on the client hosts 302, 304, 306 are called data collectors 318. There is at least one collector for each host in client system 302, 304, 306. Each collector 31 8 contains specialized plug-ins that are individually enabled by a client for each host 302, 304, 306. Collector plug-ins collect data for specific client system components. The plug-ins include plug-ins 314, database plug-ins 310, server plug-ins 312, operating system plug-ins 308, and business process plug-ins 316. Each collector 318 contains all of the available plug-ins for a business system environment. After a collector is installed on a host, appropriate plug-ins must be enabled for the host. For example, if a server 304 is running on a host, the web server plug-in 312 and the operating system plug-in 308 must be enabled for that host 304. The web server plug-in captures metrics that reflect the status of the web server, and the operating system plug-in captures metrics for the host system 304. If multiple instances of an application or database are running on a host, a collector plug-in may be to monitor each instance. Monitoring additional instances does not require additional plug-ins, since only one plug-in is required to collect data from multiple domain instances.

Figure 4:
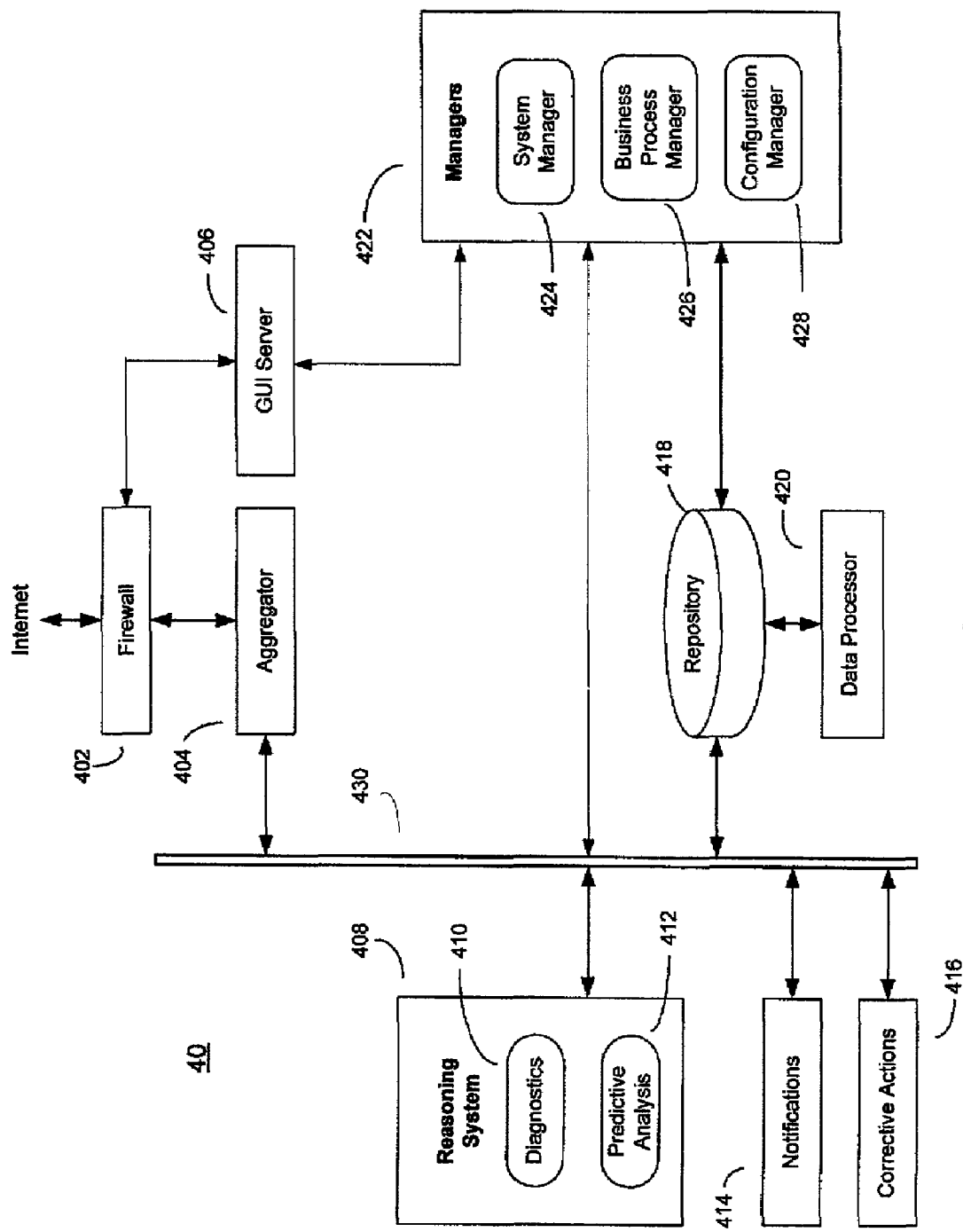
FIG. 4 shows an architecture of a management system server.

Client aggregators 320 receive extracted data from various collector plug-ins installed on host machines, and sends the data to a management server as shown in FIG. 4. The client aggregator 320 opens a socket in a firewall 326 and pipes the data through in a single stream to a system manager located on a management server as shown in FIG. 4, where it is used to track the health and performance of the client business system as well as execution of the business process. To ensure security, Secure Socket Layer (SSL) technology and data encryption techniques are used to transmit the collected data. In addition, data is transmitted via a proprietary TCP/IP-based communication protocol. To maintain a high level of efficiency and reduce network traffic, collector plug-ins only transmits data to the system manager when the values of the datapoints change. If a datapoint's value has not changed since the last collection interval, the collector plug-in does not send any data. If a datapoint's value has changed since the last collection interval, the collector plug-in sends a new value. The system manager makes the necessary calculations to determine if a datapoint value has exceeded a threshold and therefore requires analysis. Collector plug-ins perform some simple calculations on incoming datapoints, such as summation, averaging, etc. More complex calculations are performed in the management system server. Table 1 shows some typical types of data that is collected by a web server plug-in 312.

TABLE 1

| Information Collects | Example |
| --- | --- |
| Web server configuration | Server address, server port, number of http processes. |
| Web server performance | 404 errors, response time, thread usage, memory usage. |
| Web page | Web page requests per hour, day, week, or year. |
| URI errors | Error count per URI. |
| Persistent connections | Number of persistent connection requests or number of persistent connection failures. |
| Web server cache | Current cache size or ratio of cache hits to the number of look-up requests. |
| Web server Security | Number of active or idle threads. Is security active? |

A database plug-in 310 monitors instances of a database host. One database plug-in is capable of monitoring multiple instances of databases. Table 2 shows some typical types of information that the database plug-in 310 collects.

TABLE 2

| Information Collected | Example |
| --- | --- |
| Sessions | Number of current and active sessions. |
| Tablespaces and tables | Tablespace status, free space, table size, extents. |
| Database files | Tablespace name, file size, number of blocks. |
| Database server | Running processes, CPU and memory usage. |
| Listener and instance manager | Listener process name and status. |
| Disk-intensive SQL and cursor usage | Average time for SQL command, number of open cursors. |
| Rollback transactions and contentions | Number of GETS and consistent changes. |
| Library cache | Hit ratio for library cache. |

An operating system plug-in 308 collects data from the host operating system. Table 3 shows some typical types of information that the operating system plug-in 308 collects.

TABLE 3

| Information Collected | Example |
| --- | --- |
| Network | Number of incoming and outgoing packets. |
| System processor | Percentage of processor utilization or idle time. |
| System processes | Number of active processes, percent of CPU utilization by processes, number of page faults second. |
| Physical memory | Amount of available and used memory. |
| Virtual memory | Amount of available and used virtual memory, number of page read and writes per second. |
| System cache | Number of cache hits. |
| File system | Amount of used and free space, file system |
| Directory changes | Number of new files in a directory. |
| Configuration | IP address, DNS address, default gateway. |
| TCP/IP usage | Number of current and reset connections, number of failed connection attempts. |

Application plug-ins 314 extract low-level and mid-level data that concern a vendor application. They collect information that is specific to a particular application. Business process plug-ins 316 extract high level data concerning a vendor application, as well as related types of data concerning the vendor business process. A business process manager in the management server uses this data to determine the effectiveness and efficiency of the business process.

The business systems transaction and infrastructure management system of present invention provides a graphical user interface (GUI) 324 that runs on a web browser, allowing users to connect to the management server of the system an intranet or the Internet. This interface provides different views of all elements that are involved in the execution of the business process, and displays system status information, business transaction execution information, and real-time diagnostics. Detailed information is available for every application, database, and operating system platform that is involved in the business process. The GUI 324 provides a listing of all notifications that result from problems that the various engines in the management server report.

The system client also includes a configuration client 322 that maintains the current configuration of the host system 302, 304, 306. The configuration data by the configuration client may be either hard coded into the client system, or may be downloaded from the management server.

Turning now to FIG. 4, FIG. 4 shows an architecture of a management system server 40. The management server 40 logically groups software that combines, correlates, and analyzes data that the collections system described above extracts form the client business system. The management server consists of several server processes that perform the central functions of the product. These server provide back-end processing for model instantiation, system status evaluation, GUI display generation, report generation, configuration management, real-time diagnostics, and predictive analysis. The management server comprises a system manager 424, a business process manager 426 if required, and a configuration manager 428 connected to the repository 418, a system communication bus 430, and a GUI server 406. A data repository 418 connects to the system manager 424, the business process manager 426, the configuration manager 428, a data processor 420 and the system communication bus 430. At least one aggregator connects to a firewall 402 and the system communication bus 430. The data processor 420 connects to the repository 418. A reasoning system 408, a notifications processor 414, and a corrective actions processor 416 connect to the system communication bus 430. The GUI server 406 connects between the firewall 402 and the system manager 424, business process manager 426 and the configuration manager 428. The firewall 402 connects to the Internet.

The system manager 424 is the central system controller that understands the communication and data exchange protocols. During configuration, the system manager 424 creates objects in the repository 418 based on the customization of a target business system. During runtime, the system manager 424 can create new objects, or instantiate those it has already defined. The system manager 424 is responsible for modeling data, generating patterns, recognizing datapoints that trigger analysis, and maintaining relationships between data extracted from system components. It receives data about collector installation, domain configuration, datapoints, and processes data in a queue on a first-come, first-serve basis. The system manager 424 creates new domains, components, and datapoints in a database; modifies strings of existing domains, components, and datapoints; creates and maintains relationships between objects in the database; inserts new datapoint values into the database; determines whether the current datapoint value has met or exceeded a threshold; addresses errors that are generated in the data insertion phase; addresses communication messages by sending results to the components, updating the GUI with changes, and communicating with the client using proprietary protocols; builds datasets by maintaining a snapshot of the client environment and maintaining relationships between components; and normalizes raw data for analysis and converts data into a map value. Initialization procedures for the management server are initiated when the system manager 424 starts a single monitor process. All other server processes are then started. Once the manager 424 is started, it tracks each process and restarts any processes that go down.

The business systems transactions and infrastructure management system described herein is a complete, object-oriented system. Data objects that business process workflows, business applications, databases, and operating systems are stored in an Object-Oriented Database Management System Using XML representations, the system manager 424 and other server components create and instantiate these objects in the repository 418 at initialization. Run-time data such as client configuration data and client system status information are also stored in the repository 418. The management system contains an efficient data model that allows multiple engines to use the same data. The repository 418 is the central store for configuration data, collected data, the knowledge base, the business process, component models, and relationship models. The repository 418 also contains a knowledge base that encapsulates the expertise of business system administrators, and application administrators. The reasoning system 408 uses the decision tables in the knowledge base to identify complex problems that involve multiple applications and components.

The management server 40 contains one or more aggregators 404 that act as a hub and a router. Various sources send their data through the aggregator 404, enabling the data to pass through firewalls 402 to other destinations in the Aggregators 404 perform various functions, including maintaining system security when passing data through firewalls 402, transmitting extracted data from a collection system described above to the system manager 424 and other management server components, relaying messages and instructions from the management server components to the collection system, and monitoring connectivity of both the client and server components of the management system, including notifying the system manager 424 of connectivity lapses. The location configuration of aggregators 404 depends on the number of firewalls 402. At a minimum, a system requires two aggregators 404, one on each side of a firewall 402. One is the client aggregator in the collection system (see 320 in FIG. 3) and other is the management server aggregator 404 shown in FIG. 4. Aggregators 404 preserve firewall security by piping all data through a single, full duplex socket, using Secure Sockets Layer (SSL) and data encryption. Aggregators 404 can accept data from multiple sources. The aggregator 404 briefly caches the data, and pipes in a single stream through one dedicated socket in a firewall 402. On the other of a firewall, a second aggregator receives the data and forwards it to the appropriate target destination, which may be a single or multiple destinations. The management server aggregator 404 passes messages and instructions from the server components to the collection system. For example, when there is a need to change the intervals for collecting web server (312 in FIG. 3) data in a client collection system using a configuration client (322 in FIG. 3), the configuration manager 428 sends instructions to the management server aggregator 404, the aggregator 404 relays the interval instructions through the firewall 402, the client aggregator (320 in FIG. 3) accepts the instructions and notifies the appropriate collector (318 in FIG. 3) which notifies the web server plug-in (312 in FIG. 3), and plug-in initiates the interval change. Both client and server aggregators monitor socket connectivity and host availability for all server components. Each aggregator monitors the connections through which it receives its data. The management aggregator 404 monitors socket connectivity of all server components such as the system manager 424, configuration manager 428, and reasoning system 408, and socket connectivity with client aggregators.

The data processor 420 performs calculations on raw data received from the collection system. It provides statistics on the extracted data and performs processing such as calculating datapoints that span collection cycles. For example, the data processor 420 computes the daily average or the standard deviation on collected data. It also generates datapoints and stores them in the repository 420.

The configuration manager 428 manages changes in business system environments as businesses change business processes and their execution infrastructures. When a collector in a collection subsystem detects changes in a business system configuration, or when the configuration manager 428 is used to make configuration changes to a business system, the configuration manager 428 updates object models in the repository 418. In this manner, the management system can reconfigure itself to adapt to a new environment. The configuration manager 428 is responsible for the configuration of the entire management The configuration manager 428 makes use of a GUI that is used to fine-tune the management system client and server components. A web browser GUI (324 in FIG. 3) for use with the configuration manager 428 is shown connected to the firewall in the collection system, although it may reside anywhere that provides a connection the Internet. This GUI enables a user to configure individual collector plug-ins, establish data collection intervals, create corrective actions, execute semi-automated corrective actions, and view analysis results and corrective actions executed. The web browser GUI communicates with the configuration manager which communicates with configuration clients in the host system.

The business process manager 426 interacts with the system manager 424 to calculate and aggregate workload and performance statistics, track failed of business processes, analyze business impact, and display current results. Using predefined knowledge of the business environment and the relationships between process definitions and the underlying infrastructure components, the business process manager can quickly detect failures in the business process and their causes.

The reasoning system 408 analyzes data collected by the collection system to determine the health of a business system. The reasoning system 408 consists of extensive knowledge base of problems and associated recommendations, and analysis engines that detect and predict problems. A diagnostic engine 41 0 is used to detect and analyze faults, and a predictive analysis engine 412 is used to potential problems before they result in faults.

The management server 40 is able to inform users when conditions change may lead to a problem through a notification manager 414. In addition to viewing status messages in a GUI and configuring the notification manager 414 to send email, numeric pager, and text pager notifications when changes or problems a user may configure the corrective actions manager 416 to resolve a problem or condition automatically or on demand.

The management server contains a GUI server 406 to provide an interface with the transactions and infrastructure management system. The GUI server, which on a web browser, uses XML source for its pages. When a GUI page is requested, GUI server 406 obtains the most current data from the repository and constructs requested page.

Figure 5:
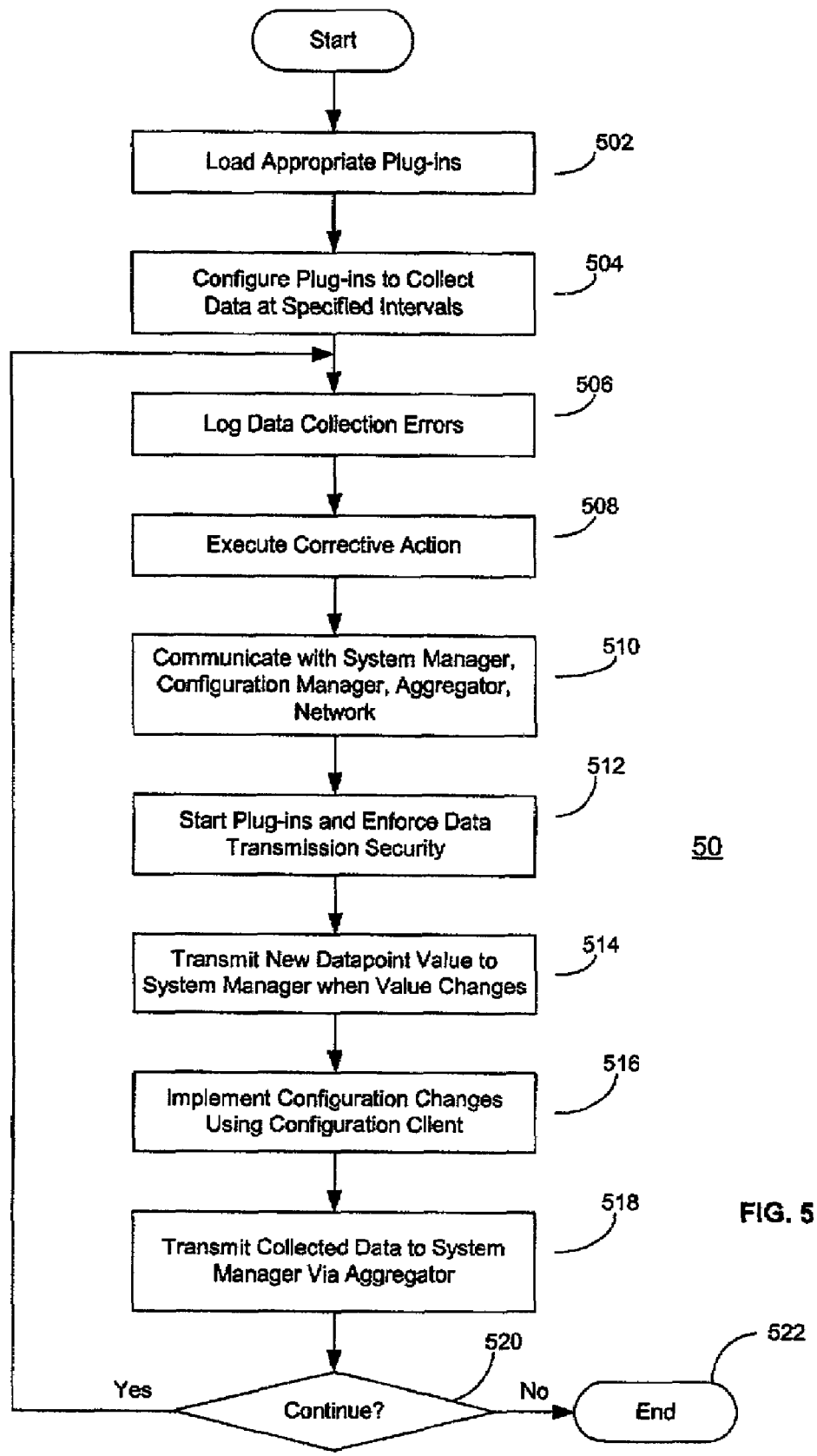
FIG. 5 shows a flow diagram for a data collection process.

Turning now to FIG. 5, FIG. 5 shows a flow diagram 50 for a data collection process. At the time of installation of the management system, a client collector system is installed on a client system, as shown in FIG. 3. Data collectors provide services to other components of the management system by using appropriate ins to extract detailed information about the relevant business environment. Data collectors and appropriate plug-ins are installed 502, and collection intervals are configured for each plug-in 504 on each host. When the host is started, the configured plug-ins are loaded into memory and each plug-in collects data at the rate that was specified at configuration time. Any data collection errors are logged 506 and corrective action is executed 508. The data collectors communicate with a system manager, configuration manager, aggregator and the network 510 in order to execute its functions. The plug-ins are started and data transmission security is enforced 512, and mew datapoint values are sent to the system manager by the collector only when there is a change in value 514. If no change in datapoint value has occurred, no data is sent, reducing the volume of network traffic. changes are implemented to the host system configuration using the configuration client 516. Collected data is transmitted via an aggregator to the system manager 518, which stores it in a repository for determination of whether analysis of the is required. If required, the system manager submits the appropriate dataset to the reasoning system for analysis. The process continues 520 until the execution is terminated 522.

The transactions and infrastructure management system is an object-oriented system. The system manager and other server elements create and instantiate data objects representing business process workflows, business applications, and operating system resources that are stored in an Object-Oriented Database Management System (OODBMS). The database may also be a relational database. Using XML representations, the system manager and other server components and instantiate these objects in a repository at time of installation. Run-time data such as client configuration data and client system status information are also stored in the repository. The system uses a data model that is very efficient and allows multiple processes to use the same data.

The system captures the definition of business processes through workflow models that encapsulate every step of their execution. It also captures the characteristics of applications, systems, and databases in object models representing each element of the execution infrastructure. Interdependencies among business processes, applications, databases, and operating platforms are captured in relationship object model that bind the business process and the entire execution infrastructure. These object models are instantiated at runtime and in the repository as representations of elements of business process infrastructure referred to as data objects. Key data objects include domain, instance, component, datapoint, dataset, and relationships.

A domain is the highest level class that is managed by the system. Domains are associated with a web server, operating system, database and business application. Domains group related components.

A component is part of a domain whose data is being tracked. For example, a file system, system process, and log file are all components. Components are modeled as a group of data points belonging to the same area, performing the function, or sharing common attributes. Each domain contains one or more components, and a component has a type and one or more instances. The type represents the overall category of the component object, while an instance consists of a specific case within that category. For example, a file system is a type of component on a server, while a file system partition is an instance if a file system component. An instance is defined as a specific case or example of a component.

In a particular domain, one component may be a file system. An instance of the file system component is a particular file system partition. Multiple instances of a component may exist. A second instance of the file system may be a second file system partition.

Datapoints are the monitored characteristics of components and component instances. File system datapoints might include total disk space, amount of free space, and amount of used space on the disk. Associated with each datapoint is a unique definable metric, or unit of measure whose value identifies a specific aspect or characteristic of the component. The collector plug-ins extract the values of datapoints from the host machines. Datapoints typically store real values. For example, CPU utilization is expressed as a percentage.

Datasets are logical collections of datapoints stored within the repository. The datapoints in each dataset can belong to any number of components, and any number of datasets can contain the same datapoint. The groupings are based on various types of relationships between datapoints. For example, since database function is affected when a file system runs low on space, a dataset might group datapoints that monitor file system space within the operating system domain, datapoints that monitor database activity in the database domain. Each dataset represents an attribute that the reasoning system uses for analysis. In order to compare the states of several datapoints without knowing the actual values of the datapoints, datasets use normalized values. Dataset definitions are created during the knowledge capture phase prior to product distribution. At run time, the system manager creates instances of dataset definitions. These dataset instances are used by the reasoning system for analysis.

Relationships connect two or more things as being, belonging, or working together. Components often have relationships with one another. For example, a word processing application may depend on a printer connected to a particular in order to print, and therefore establishing a relationship. The relationship components is very important when creating individual datasets. When building dataset instances, the server looks for these relationships. For example, if the printer and spooler are related to each other and there is a dataset definition that contains datapoints for both, a dataset instance will combine only the datapoints from the related printer and spooler. This is crucial to the problem determination that is based on this relation. If the printer is inoperative, only the spooler that is associated with that printer is affected. The system manager instantiates datasets based on relationships. As the system manager collects, stores, and analyzes data from a system, the management server checks for relationships that exist between the various elements of a business enterprise. Relationships are the dependencies, interactions, and working associations among domains, components, component instances, and datapoints that are being monitored.

The transactions and infrastructure management system uses a collection system, depicted in FIG. 3, to collect and store data about a business system environment. The reasoning system (408 in FIG. 4) then analyzes the data to determine the health of the business system. The reasoning system consists of an extensive knowledge base of problems and associated recommendations, and analysis engines that detect and predict problems. Once the data is analyzed, if a problem or unusual condition is present, notifications may inform a user or group about tat problem or condition. A corrective action script may automatically resolve the problem. These features help to ensure that a business system remains and productive to meet the needs of the business. The reasoning system performs data analysis and provides two main functions. The diagnostic engine (410 in FIG. uses collected data to ascertain the probable cause of anomalies in a business system. Once a cause is identified, the diagnostic engine provides advice for resolving the problem or condition. Notifications may be sent to a user, or action may be automatically activated. A predictive analysis engine (412 in FIG. 4) uses collected data to determine trends in a business system, allowing it to performance loads and system failures.

Figure 6:
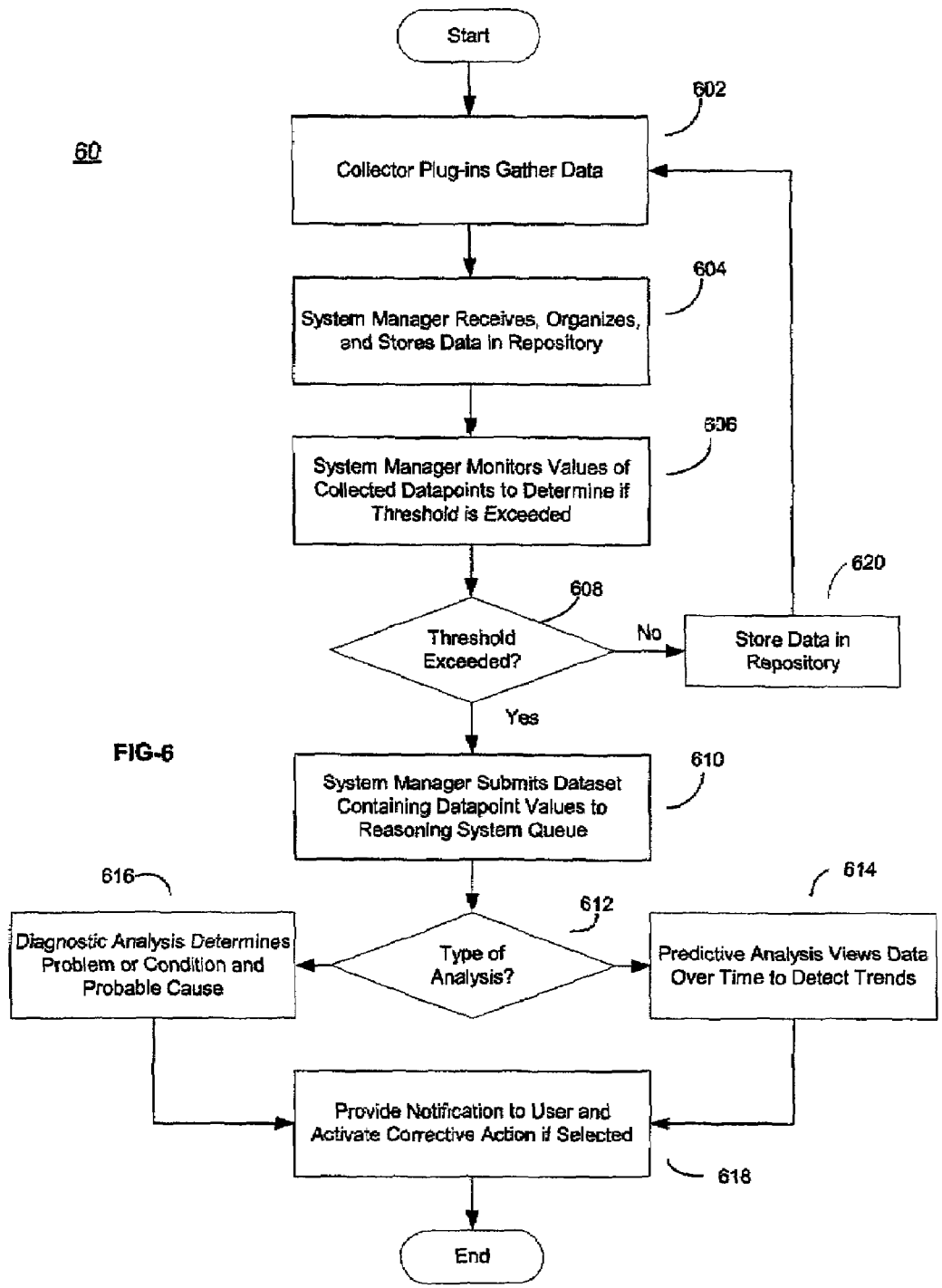
FIG. 6 shows a flow diagram for a data analysis process.

Turning now to FIG. 6, FIG. 6 shows a flow diagram 60 for a data analysis process. The collector plug-ins gather data 602 from each host and domain in a host business system, and the system manager receives, organizes, and stores the collected data in a repository 604 as datapoints and datasets. As it receives the the system manager monitors the values of the collected datapoints to determine if a threshold has been exceeded 606. If a datapoint exceeds a threshold 608, the system manager submits the dataset to which the datapoint belongs to a queue for reasoning system 610. If a datapoint does not exceed a threshold 608, the is stored in the repository 620 and the data gathering step 602 is repeated. This analysis occurs quickly. A slight delay incurred by submitting the analysis request a queue allows the data to stabilize, making it difficult to trace a source of the problem. The reasoning system determines what type of analysis is needed and submits the dataset to either a diagnostic engine or a predictive analysis engine If submitted to the diagnostic analysis engine, the diagnostic analysis engine analyzes the problem or condition and determines probable cause 616. If to the predictive analysis engine, the predictive analysis engine views the data over period of time to detect trends 614. If one of the analysis engines discovers a problem or trend, it generates an analysis result and a notification, for example, either a probable cause of a problem notification or an estimated time to failure or impact notification, which is provided to a user 618. Notifications may be by email, numeric page, or text page to an appropriate individual or group of individuals. If corrective action has been selected for the particular problem or condition, a corrective script will run automatically or by user initiation on the host that is experiencing the problem 618. The reasoning system diagnoses problems and conditions, and makes predictions based on a threshold value for datapoints. For example, if a datapoint measure CPU utilization, the threshold determines whether CPU utilization is low (good), medium (fair), high (warning), or very high (critical). This distinction is important in data analysis because it determines how the condition is diagnosed. When a reasoning system analyzes a dataset, it may not generate an analysis result. It only generates an analysis result when a data pattern matches information in a knowledge base with a high degree of certainty.

The diagnostic engine can identify patterns in collected data, which allow it to determine the state of the system or a problem that may be present. To this, the system manager organizes the data into datasets, each of which contain specific datapoints. The system manager stores datasets in a repository. A describes a specific attribute of a component, such as CPU utilization and available disk space. A dataset is a group of datapoints with a certain value range, For example, a dataset may contain a datapoint for CPU utilization that has a "warning value", indicating that the CPU is almost fully utilized. When the reasoning system submits a dataset to the diagnostic engine for analysis, the diagnostic engine retrieves the dataset from the repository, examines the patterns in the data, and matches these patterns with information in its knowledge base that best describes the current state, potential problems, or existing problems. If the diagnostic finds an anomaly, it determines the probable cause or condition and generates an analysis result that may be viewed using a GUI. Each analysis result describes the problem or condition, its severity, the date and time of occurrence, and short and long-term solutions, if applicable. Problems or conditions can trigger notifications individuals or groups of individuals, and corrective action script to remedy the problem or condition.

The predictive analysis engine analyzes collected data over time to discover trends in a host business system. Predictive analysis discovers trends in degrading performance and potential system failures. When the predictive analysis engine diagnosis a problem or condition, it analyzes datapoint values over time to determine trends in system resources and business processes. If the predictive analysis engine detects a trend, it produces and sends an analysis result to a GUI. The analysis result may be a graph that displays the values of a datapoint or datapoints over time. Predictive analysis estimates the time available until are depleted or until a failure occurs, warning the user in advance to enable correction of the problem or condition.

When the reasoning system diagnoses an anomaly and reports the analysis result, the notification manager automatically sends an email, a numeric page, or a text page to a user or group of users. A knowledge base defines the affected Group members, email addresses and paging destinations must be configured. Notifications may be configured and customized. Only configured groups are notified. After groups and destinations are configured, the reasoning system analyzes the data and determines the condition or problem that caused it, an analysis result, and the notification manager notifies the impacted group.

Figure 7:
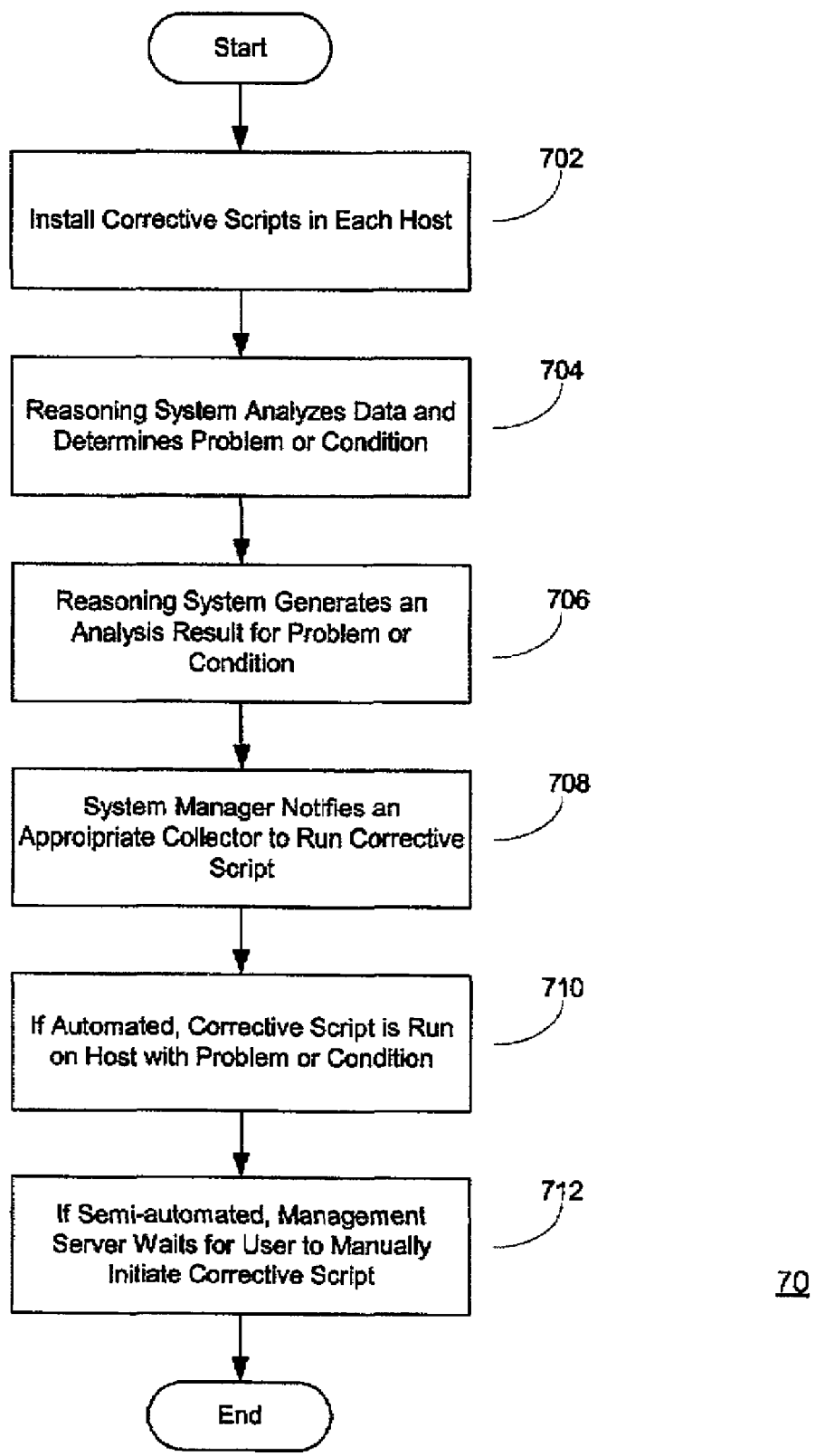
FIG. 7 shows a flow diagram for a corrective action process.

Turning now to FIG. 7, FIG. 7 shows a flow diagram 70 for a corrective action process. This process is invoked when abnormal conditions or problems occur, and can be configured to resolve the problem or condition automatically or on demand. Corrective actions are associated with analysis result cases. Corrective scripts must be installed in each host prior to their use 702. The reasoning system analyzes and determines the condition or problem that caused it 704. When the reasoning system matches patterns in the collected data with information in the knowledge base, it generates an analysis result that describes the problem or condition 706. The system manager then notifies an appropriate collector to run an appropriate corrective script 708. If the corrective script has been configured to be an corrective action, the script runs on the host with the identified problem or 710. If the corrective script has been configured to be a semi-automated corrective action, the management server requests a user's manual approval before executing the corrective script on the host with the identified problem or condition 712.

Although the present invention has been described in detail with reference to certain preferred embodiments, it should be apparent that modifications and adaptations to those embodiments may occur to persons skilled in the art without departing from the spirit and scope of the present invention as set forth in the following claims.

The invention claimed is:

1. A system for managing business systems transactions and infrastructure, comprising:
   a collection system embedded in a client system, including one or more data collectors having at least one plug-in for extracting business transaction process data and infrastructure data from client system components, and a secure client connection to a communication network for transmitting the extracted data from the client aggregator and communicating over the network; and
   a management server including a system manager for controlling the management server, a secure server connection to the communication network for communicating over the network and receiving the extracted data from the client collection system, the system manager for comparing the received extracted data with threshold values, a repository for storing a knowledge base and the extracted data, a reasoning system for performing data analysis on the extracted data that exceed threshold values, and a notifications manager for notifying users of abnormal conditions based on the data analysis.

2. The system of claim 1, further comprising: a client aggregator for receiving the extracted data from the data collectors; and a server aggregator for receiving the extracted data from the secure connection.

3. The system of claim 1, further comprising a corrective actions manager for activating corrective action scripts in client systems over the communication network.

4. The system of claim 1, further comprising a graphical user interface server connected to the secure server connection to the communication network and a web browser graphical user interface connected to the secure client connection to the communication network for communication with the graphical user interface server.

5. The system of claim 1, wherein:
the collection system further comprises one or more configuration clients for receiving configuration commands for configuring the client system; and
the management server further comprises a configuration manager for sending configuration commands to the collection system.

6. The system of claim 1, wherein the data collector plug-in is selected from the group consisting of operating system plug-in, database plug-in, business process plug-in, web server plug-in, and application plug-in.

7. The system of claim 1, wherein the secure server connection and the secure client connection to the communication network are firewalls.

8. The system of claim 1, wherein the management server further comprises a business process manager for analyzing and tracking client business system processes based on the extracted data.

9. The system of claim 1, wherein the management server further comprises a data processor for performing complex calculations.

10. The system of claim 1, wherein the management server reasoning system comprises a diagnostic engine and a predictive analysis engine for analyzing the extracted data datasets and activating the notifications manager.

11. The system of claim 3, wherein the management server reasoning system comprises a diagnostic engine and a predictive analysis engine for analyzing the extracted data datasets and activating the corrective actions manager.

12. The system of claim 1, wherein the repository is an object oriented database management system.

13. The system of claim 1, wherein the repository is a relational database management system.

14. The system of claim 1, wherein the system components from which data are extracted is selected from the group consisting of a database host operating system, a database host database management system, a database host business process, a database host hardware components, a web host operating system, a web host web server, a web host business process, a web host hardware components, an application host operating system, an application host application programs, an application host business process, and an application host hardware components.

15. The system of claim 3, wherein the embedded collection system further includes corrective scripts associated with the data collectors that are activated by a server command from the corrective actions manager.

16. The system of claim 1, wherein the communication network is the Internet.

17. A method for managing business systems transactions and infrastructure, comprising the steps of:
extracting business transaction process data and infrastructure data from client system components by a data collector and data collector plug-ins;
transmitting first extracted data through a secure client connection to a communication network;
transmitting subsequently extracted data to a communication network in response to a detected difference between the first transmitted data and the subsequently extracted data;
receiving the extracted data through a secure server connection to the communication network;
comparing the extracted data by a system manager with threshold values stored in a repository;
submitting the extracted data to a reasoning system if the extracted data exceeds a threshold value;
analyzing the extracted data submitted to the reasoning system; and
notifying a user affected by the results of the reasoning system analysis by a notification manager.

18. The method of claim 17, further comprising: aggregating the extracted data by a client aggregator; transmitting the extracted data by the client aggregator; and receiving the extracted data by a server aggregator.

19. The method of claim 17, further comprising storing the received extracted data in the repository.

20. The method of claim 17, further comprising automatically activating a corrective script in the client system by a corrective actions manager to correct a problem found by analyzing the extracted data.

21. The method of claim 17, further comprising manually activating a corrective script in the client system by a corrective actions manager to correct a problem found by analyzing the extracted data.

22. The method of claim 17, wherein the analyzing step comprises: detecting a problem from the extracted data by a diagnostic analysis engine; and associating the detected problem with a recommended solution found in a knowledge base stored in the repository.

23. The method of claim 17, wherein the analyzing step comprises: collecting the extracted data over time; detecting a trend in the collected extracted data by a predictive analysis engine; and estimating a time duration for a failure condition to occur.

24. The method of claim 17, wherein the notifying step comprises: accessing a knowledge base in the repository to determine a user affected by the results of the reasoning system analysis; sending the results of the reasoning system analysis to a graphical user interface server; and transmitting the analysis results over the communication network to a client web browser graphical user interface for presentation to the affected user.

25. The method of claim 17, wherein the notifying step is selected from the group consisting of transmitting an email message, sending a numeric page, and transmitting a text page.

26. The method of claim 17, further comprising:
transmitting a client system configuration change request from a client web browser graphical user interface through the secure client connection to the communication network;
receiving the configuration change request by a configuration server through the secure server connection to the communication network;

communicating the configuration change request to a configuration manager from the graphical user interface server;

validating the configuration change request and communicating a configuration change order to the graphical user interface server by the configuration manager;

transmitting the configuration change order from the graphical user interface server through the secure server connection to the communication network; and receiving the configuration change order by a configuration client through the secure connection to the communication network.

27. A computer-readable storage medium containing instructions for controlling a computer system to carry out the steps of claim 17.

* * * * *